(12) United States Patent
Mohan et al.

(10) Patent No.: US 9,544,978 B2
(45) Date of Patent: Jan. 10, 2017

(54) BEACON TRANSMISSION OF A FIXTURE THAT INCLUDES SENSED INFORMATION

(71) Applicants: Tanuj Mohan, Mountain View, CA (US); Vijayalakshmi Krishnamurthy, Sunnyvale, CA (US)

(72) Inventors: Tanuj Mohan, Mountain View, CA (US); Vijayalakshmi Krishnamurthy, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 0 days.

(21) Appl. No.: 14/685,834

(22) Filed: Apr. 14, 2015

(65) Prior Publication Data

US 2015/0223309 A1    Aug. 6, 2015

Related U.S. Application Data

(63) Continuation-in-part of application No. 14/549,830, filed on Nov. 21, 2014, now Pat. No. 9,345,115, which is a continuation-in-part of application No. 13/691,562, filed on Nov. 30, 2012, now Pat. No. 8,994,295.

(51) Int. Cl.

| H05B 37/02 | (2006.01) |
|---|---|
| G05B 15/02 | (2006.01) |
| G01S 5/00 | (2006.01) |
| G01S 5/02 | (2010.01) |
| G01S 1/04 | (2006.01) |
| G01S 1/68 | (2006.01) |

(52) U.S. Cl.
CPC ......... *H05B 37/0272* (2013.01); *G01S 1/042* (2013.01); *G01S 1/68* (2013.01); *G01S 5/0036* (2013.01); *G01S 5/0257* (2013.01); *G05B 15/02* (2013.01); *H05B 37/0218* (2013.01); *H05B 37/0227* (2013.01); *H05B 37/0245* (2013.01); *G05B 2219/2642* (2013.01); *Y02B 20/46* (2013.01)

(58) Field of Classification Search
CPC ................................ H05B 37/00; H05B 37/02
USPC ................................ 315/152, 307, 312, 360
See application file for complete search history.

(56) References Cited

U.S. PATENT DOCUMENTS

| 5,101,141 A | 3/1992 | Warner et al. |
|---|---|---|
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |

(Continued)

*Primary Examiner* — Tung X Le
(74) *Attorney, Agent, or Firm* — Brian R. Short

(57) ABSTRACT

An apparatuses, methods and systems for beacon transmission of a fixture that includes sensed information are disclosed. For an embodiment, the fixture includes a sensor operative to generate a sense signal, communication circuitry operative to maintain a link with a network, a wireless transmitter, and a controller. The controller is operative to receive the sensed signal, manage communication with the network, and manage transmission of beacons through the wireless transmitter, wherein the beacons include information associated with the fixture, wherein the information includes at least information of the sense signal.

21 Claims, 9 Drawing Sheets

(56) References Cited

U.S. PATENT DOCUMENTS

| | | |
|---|---|---|
| 7,348,736 B2 | 3/2008 | Piepgras et al. |
| 7,382,271 B2 | 6/2008 | McFarland |
| 7,437,596 B2 | 10/2008 | McFarland |
| 7,550,931 B2 | 6/2009 | Lys et al. |
| 7,566,137 B2 | 7/2009 | Veskovic |
| 7,623,042 B2 | 11/2009 | Huizenga |
| 7,792,956 B2 | 9/2010 | Choong et al. |
| 7,925,384 B2 | 4/2011 | Huizenga et al. |
| 8,344,660 B2 | 1/2013 | Mohan et al. |
| 8,368,321 B2 | 2/2013 | Chemel et al. |
| 8,457,793 B2 | 6/2013 | Golding et al. |
| 8,461,778 B2 | 6/2013 | Mohan et al. |
| 8,493,209 B2 | 7/2013 | Mohan et al. |
| 8,558,466 B2 | 10/2013 | Curasi et al. |
| 8,587,219 B2 | 11/2013 | Mohan et al. |
| 8,587,225 B2 | 11/2013 | Ashar et al. |
| 8,729,833 B2 * | 5/2014 | Chemel ............ H05B 33/0854 315/308 |
| 8,796,958 B2 | 8/2014 | Billig et al. |
| 9,006,996 B2 | 4/2015 | Mohan |
| 9,345,115 B2 | 5/2016 | Mohan |
| 2004/0002792 A1 | 1/2004 | Hoffknecht |
| 2005/0169643 A1 | 8/2005 | Franklin et al. |
| 2005/0278047 A1 | 12/2005 | Ahmed |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2007/0291483 A1 | 12/2007 | Lys |
| 2008/0185597 A1 | 8/2008 | Wu |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2009/0267540 A1 | 10/2009 | Chemel et al. |
| 2010/0026479 A1 | 2/2010 | Tran |
| 2010/0034386 A1 | 2/2010 | Choong et al. |
| 2010/0135186 A1 | 6/2010 | Choong et al. |
| 2010/0264846 A1 | 10/2010 | Chemel et al. |
| 2010/0270933 A1 | 10/2010 | Chemel et al. |
| 2010/0295482 A1 | 11/2010 | Chemel et al. |
| 2010/0301777 A1 | 12/2010 | Kraemer |
| 2011/0031897 A1 | 2/2011 | Henig et al. |
| 2011/0199010 A1 | 8/2011 | Cho et al. |
| 2012/0293075 A1 | 11/2012 | Engelen et al. |
| 2013/0293877 A1 * | 11/2013 | Ramer ............... H05B 33/0842 356/213 |
| 2014/0285095 A1 * | 9/2014 | Chemel ................ F21S 2/005 315/152 |
| 2015/0008831 A1 | 1/2015 | Carrigan et al. |

* cited by examiner

US 9,544,978 B2

BEACON TRANSMISSION OF A FIXTURE THAT INCLUDES SENSED INFORMATION

RELATED APPLICATION

This patent application is a continuation-in-part (CIP) of U.S. patent application Ser. No. 14/549,830 filed Nov. 21, 2014, having the title "DISTRIBUTED LIGHT FIXTURE BEACON TRANSMISSION", which is a which is continuation-in-part (CIP) of U.S. patent application Ser. No. 13/691,562 filed Nov. 30, 2012, having the title "COMMISSION OF DISTRIBUTED LIGHT FIXTURES OF A LIGHTING SYSTEM", which are all herein incorporated by reference.

FIELD OF THE EMBODIMENTS

The described embodiments relate generally to building control. More particularly, the described embodiments relate to beacon transmission of a fixture that includes sensed information.

BACKGROUND

Location identification within a building or residence can be estimated by a device within the building or residence receiving beacons from transmitters within the building or residence. Based on known locations of the transmitters, an approximate estimate of the location of the device can be performed. However, such beacon based indoor positioning lacks accuracy needed to enable communication with and control of proximate resources.

Lighting control systems automate the operation of lighting within a building or residence based upon, for example, preset time schedules and/or occupancy and/or daylight sensing. The Lighting systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Typically, lighting systems receive the sensor signals at a central lighting controller.

The lighting systems are advantageous because they typically reduce energy costs by automatically lowering light levels or turning off devices and appliances when not needed, and they can allow all devices in the system to be controlled from one location.

It is desirable to have a method, system and apparatus for beacon transmission of a building fixture that includes sensed information.

SUMMARY

One embodiment includes a fixture. The building fixture includes a sensor operative to generate a sense signal, communication circuitry operative to maintain a link with a network, a wireless transmitter, and a controller. The controller is operative to receive the sensed signal, manage communication with the network, and manage transmission of beacons through the wireless transmitter, wherein the beacons include information associated with the fixture, wherein the information includes at least information of the sense signal.

Another embodiment includes a method for beacon transmission of a fixture that includes sensed information. The method includes generating, by a sensor of the building fixture, a sensed signal, managing, by a controller of the building fixture, communication with the network, and managing, by the controller, transmission of beacons through a wireless transmitter of the building fixture, wherein the beacons include information associated with the fixture, wherein the information includes at least information of the sense signal.

Another embodiment includes a building system. The building system includes a plurality of building fixtures. One or more of the plurality of building fixtures includes a sensor, communication circuitry, a wireless transmitter and a controller. The sensor is operative to generate a sense signal based on at least one of sensed motion or light. The communication circuitry is operative to maintain a link with a network. The controller is operative to receive the sensed signal, manage communication with the network, and manage transmission of beacons through the wireless transmitter, wherein the beacons include information associated with the fixture, wherein the information includes sensed motion or sensed light information. The building system further includes a system controller that is interfaced with the plurality of building fixtures. The system controller is operative to received modified beacons from a mobile device, estimate a location of the mobile device, and aid a controller of at least one of the plurality of building fixtures in management of the transmission of beacons based on the estimated location of the mobile device.

Other aspects and advantages of the described embodiments will become apparent from the following detailed description, taken in conjunction with the accompanying drawings, illustrating by way of example the principles of the described embodiments.

DETAILED DESCRIPTION

Figure 1:
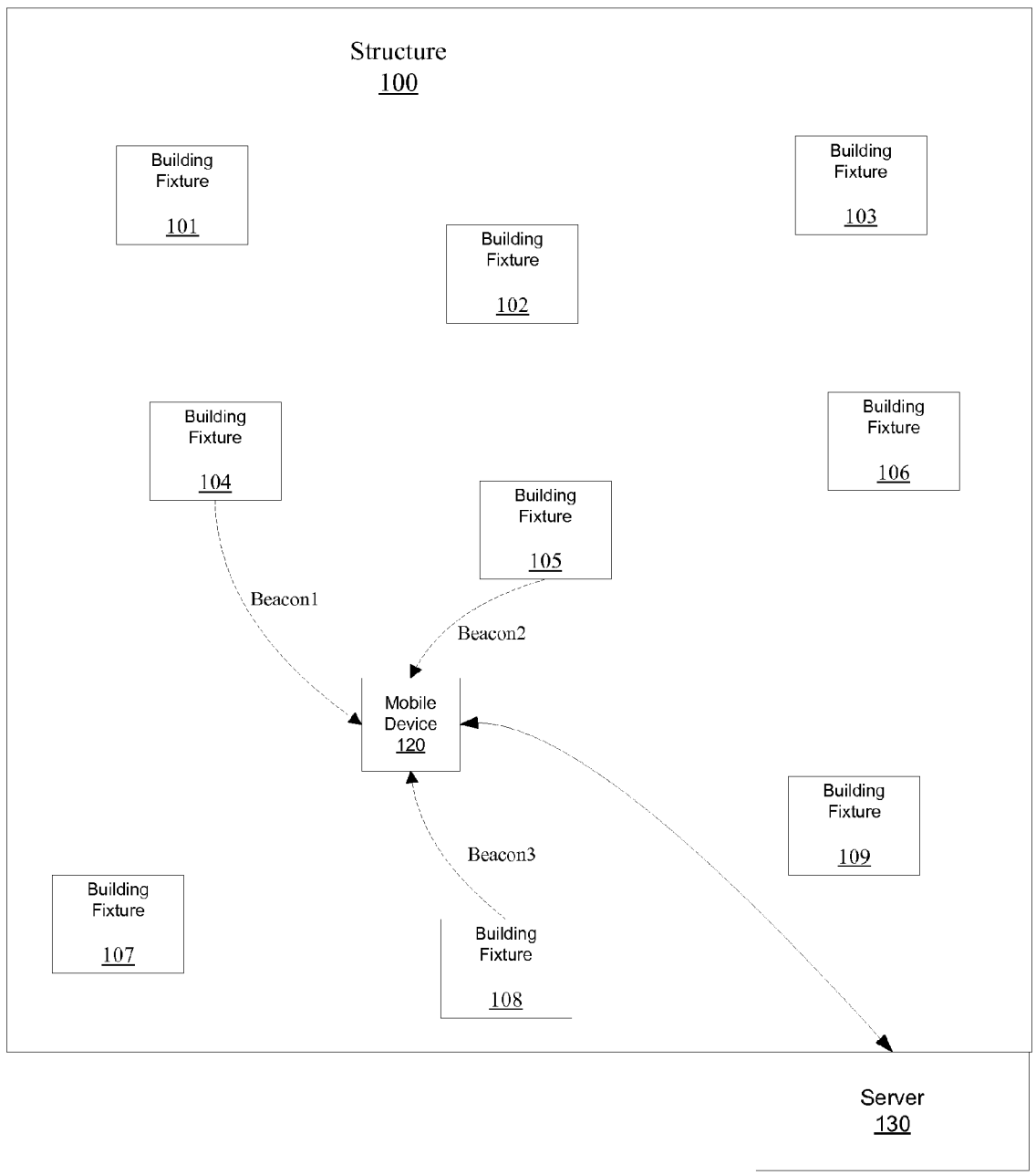
FIG. 1 shows a structure that includes a plurality of building fixtures in which the described embodiments can be utilized, according to an embodiment.

As shown in the drawings, the described embodiments are embodied in an apparatuses, methods, and systems for beacon transmission of a building fixture that includes sensed information. A mobile device receives the transmitted beacons and estimates its location based on the received beacons. For at least some embodiments, information of signals sensed by the building fixtures is included within the transmitted beacons. This additional information enables more accurate estimation of the location of the mobile device. The building fixtures of the described embodiments can be either indoor fixtures or outdoor fixtures. For example, the fixtures can be located within a building, or outside of a building, such as, in a parking lot.

For at least some embodiments, a system controller is interfaced with multiple building fixtures. Further, the system controller receives modified beacons from a mobile device that received beacons transmitted from one or more of the building fixtures. Based on the beacons and/or the modified beacons, a location of the mobile device is estimated. Further, based on sensed information included within the beacons, and/or an estimate of the accuracy of the estimated location of the mobile device, the system controller adaptively adjusts at least one of transmission power of beacons transmitted by the one or more building fixtures, or timing of the transmission of the beacons.

Environmental control systems that include the building fixtures that transmit beacons that include sense data allows for significantly better indoor location determination accuracy than beacon based location determination systems that do not include the sensed information. The improved location determination allows for more optimal use of proximate resources located within a building or structure that uses the environmental control systems.

FIG. 1 shows a structure 100 that includes a plurality of building fixtures 101-109 in which the described embodiments can be utilized, according to an embodiment. Each of the building fixtures transmits beacons that can be received, for example, by a mobile device 120. For an embodiment, the beacons are adaptively configured to having a transmission signal power level that is below a threshold. Therefore, if the mobile device receives a beacon from a building fixture, then the mobile device is proximate to the building fixture. That is, only mobile devices within a receiving distance of the transmitted beacons can receive and process the transmitted beacon. Due to the low (below a threshold) transmission power level of the transmitted beacons, mobile devices that receive the transmitted beacons are located within a small (less than a threshold) distance away from the building fixture(s) that transmitted the beacons.

For at least some embodiments, the beacons include information that includes, for example, an identifier and/or a location of the building fixture that transmitted the beacon. Therefore, the mobile device can at least approximate its location based on the location of the building fixture.

Further, for at least some embodiments, the mobile device can receive beacons from multiple building fixtures. The distance between the mobile device and each of the building fixtures can be estimated based on the received signal strength of the beacons received from each of the building fixtures. Utilizing trilateration, the location of the mobile device can be estimated based on known locations of the building fixtures and the estimated distances between the mobile device and each of the building fixtures. For an embodiment, the mobile device 120 performs the trilateration. For an embodiment, a server or controller 130 that receives beacon information from the mobile device 120 performs the trilateration.

As will be described, for at least some embodiments, the building fixtures are interfaced with, for example, the server or the controller 130. Further, for an embodiment, the server 130 receives modified beacons from the mobile device 120 that can include timing information of the beacons (such as, when the beacons are received), and/or received signal power information. Based on the modified beacons (which the mobile device 120 may have received from several different building fixtures) the server 130 can estimate a location of the mobile device 120. If the estimate is determined to not be as accurate or reliable as desired, for an embodiment, the server 130 can control the timing and signal power of future beacons transmitted from the building fixtures for aiding the building fixture beacon transmission management. The management can be used to provide beacon transmission (timing and signal power) that is better for enabling location estimation of the mobile device 120. For example, an increase in the transmission power of the beacons from the building fixtures can be used to increase the number of building fixtures that the mobile device is able to received beacons from. A decrease in the transmission power can provide a determination of which building fixture the mobile device is the closest to. Further, adjusting the timing of the transmission of the beacons from different building fixtures can further aid in the location determination of the mobile device.

Figure 2:
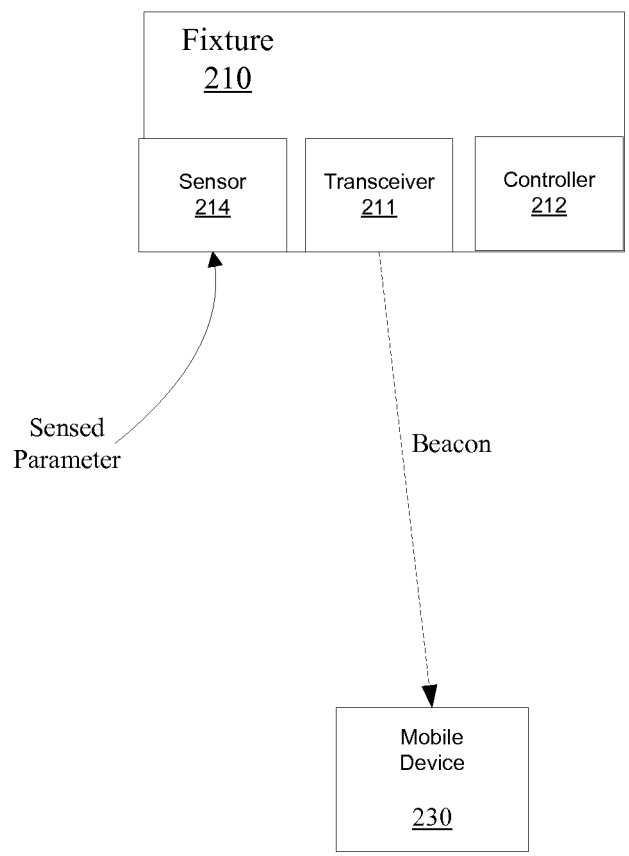
FIG. 2 shows a building fixture that transmits beacons and a mobile device that receives the beacons, according to an embodiment.

FIG. 2 shows a building fixture 210 that transmits beacons and a mobile device 230 that receives the beacons, according to an embodiment. Upon receiving the beacons, the location of the mobile device 230 can be estimated.

For at least some embodiments, the building fixture 210 includes a sensor 214. The sensor 214 is operative to generate a sense signal based on at least one sensed signal. For an embodiment, the sensor includes a motion sensor operative to sense motion. For an embodiment, the sensor includes a light sensor operative to sense light. For an embodiment, the sensor includes a PIR (passive infrared) sensor. For an embodiment, the sensor comprises an ambient light sensor. For an embodiment, the ambient light sensor senses motion and presence of a person by sensing a variation in ambient light. The variation can be determined or defined by a change in ambient light of greater than a threshold amount over a predetermined period of time. Further, the variation can be defined as less than another threshold, thereby allowing a determined difference between other factors than can change the ambient light, such as, opening shades or a door of a structure of the building fixture. Sensing the presence of an occupant is supported by small variation of the sensed ambient light greater than a nominal variation of sensed ambient light.

For an embodiment, a change or variation in sensed ambient light is compared to a baseline level, wherein the baseline level was obtained prior to the change or variation. A change or variation in sensed ambient light can be used to sense occupancy, and further a signature of the sensed ambient light over a period of time can be used to classify a type of presence and motion. For an embodiment, sensing occupancy includes sensing a variation of ambient light greater than a low-end threshold. That is, even very minor motion of an occupant causes very small variations in sensed ambient light. In typical applications, ambient light is not sensed at these low levels. Further, traditional motion sensor cannot sense motion at these low levels.

For other embodiments, the sensor additionally or alternatively includes sensed motion, and or light levels of group that sensor is part of. That is, which sensor of a particular group of sensors can be used, for example, by a system server for refining location estimations of mobile devices that receive the beacons. Also, in some other embodiments, sensing includes sense signals of acoustic sensors, wherein the acoustic sensors sense changes in sound, and in combination with a controller, can be utilized to understand voice commands.

For at least some embodiments, the building fixture 210 includes communication circuitry. The communication circuitry is operative to maintain a link with a network. The link can be a wired or wireless link.

For at least some embodiments, the building fixture 210 includes a wireless transmitter 211. The wireless transmitter 211 wirelessly transmits the beacons. Wireless mobile devices (such as, mobile device 230) receive the beacons, and locations of the wireless mobile devices are estimated based on the received beacons, and information included within the beacons.

For at least some embodiments, the building fixture 210 includes a controller 212. The controller 212 is operative to receive the sensed signal, manage communication with the network, and manage transmission of beacons through the wireless transmitter, wherein the beacons include information associated with the fixture, wherein the information includes at least information of the sense signal.

As previously described, the power level of the transmitted beacons is low, thereby ensuring the mobile devices that receive the transmitted beacons are proximate to the location of the building fixture that transmitted the beacons. Further, at least some embodiments further include adaptively adjusting a transmission signal power of the transmitted beacons. That is, conditions can be determined that indicate that the transmission signal power should be increased to increase the range (distance) between the building fixture that transmits the beacons and the mobile devices that receive the transmitted beacons, or that the transmission signal power should be decreased to decrease the range (distance) between the building fixture that transmits the beacons and the mobile devices that receive the transmitted beacons.

For an embodiment, another controller (such as, an external controller that receives modified beacons from the mobile device 230, which can be represented by the server 130, or server 440) utilizes the sense signals and beacons from multiple sensors to determine the location of the mobile device, and can send communication to specific building fixtures to adaptively modify the signal strength of the transmitted beacons. By controlling the signal strength of the beacon transmission in a specific sequence, the controller can improve the accuracy of an identified location of mobile device. Specific sequence includes a series of subsets of beacons and the signal strength of the beacons to adapt for a specific period of time. When such sequence is initiated, the controller is able to utilize the beacon with sensed signals during each sequence to progressively evaluate and improve identified location of mobile device. For an embodiment, the specific sequence that is initiated depends on the type of motion, level of ambient light and level of acoustic signals or a combination thereof.

For at least some embodiments, the transmission signal power is adaptively adjusted to be at a first level upon sensing motion, and decaying to a lower level after a period of time. That is, the transmission signal power of the transmitted beacons is adjusted to a first level, which is relatively higher upon sensing motion. Further, as time passed, the transmission signal power decays (decreases) over time as long as no subsequent motion is sensed. Eventually, if no additional of subsequent motion is sensed, the transmission signal power decreases to a minimal level.

For at least some embodiments, the transmission of beacons is triggered based on sensing motion. That is, if no motion is sensed by the sensor of the building fixture, no beacons are transmitted by the building fixture. However, upon sensing motion, beacon transmission begins. For at least some embodiments, the beacon transmission ceases after sensing no motion for at least a threshold amount of time.

Figure 3:
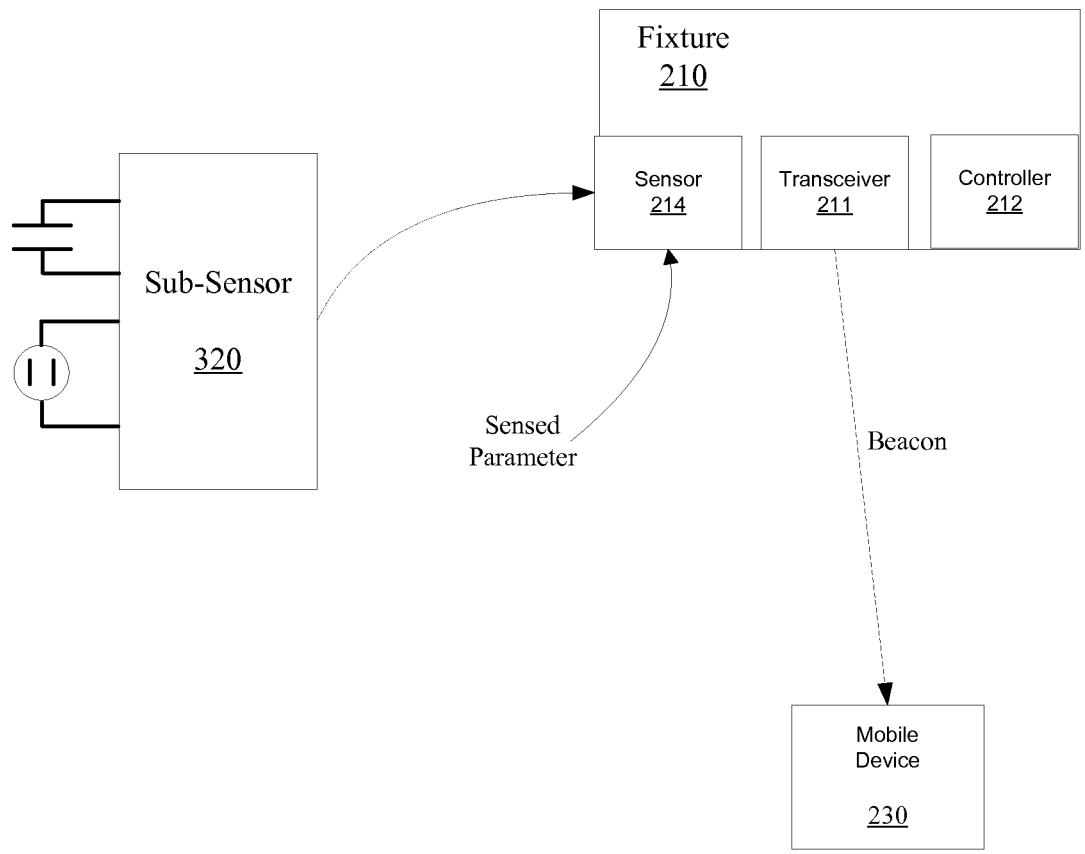
FIG. 3 shows a building fixture that transmits beacons and a mobile device that receives the beacons, according to another embodiment.

FIG. 3 shows a building fixture that transmits beacons and a mobile device that receives the beacons, according to another embodiment. For at least some embodiments, the building fixture further includes a sub-sensor, wherein the sub-sensor is interfaced with the sensor, and provides a sub-sensor sensed signal. For an embodiment, the sub-sensor senses a contact (conductive) closure. Such a contact can provide an indication of, for example, an opening and closing of a door. For an embodiment, the sub-sensor includes an electrical plug receptacle, and the sensor provides an indication that the electrical plug receptacle is being used.

For at least some embodiments, the sub-sensor 320 is associated with a badging system used, for example, at an entry way. The badging information provides additional information that can be used for estimation of the location of the mobile device, and for other purposes as well. Further, for at least some embodiments, the sub-sensor 320 is associated with building equipment, such as, copiers or other types of office devices. The sensing of such sub-sensors can be used to help to improve the accuracy of location of mobile device and the potential direction of movement of mobile device.

Figure 4:
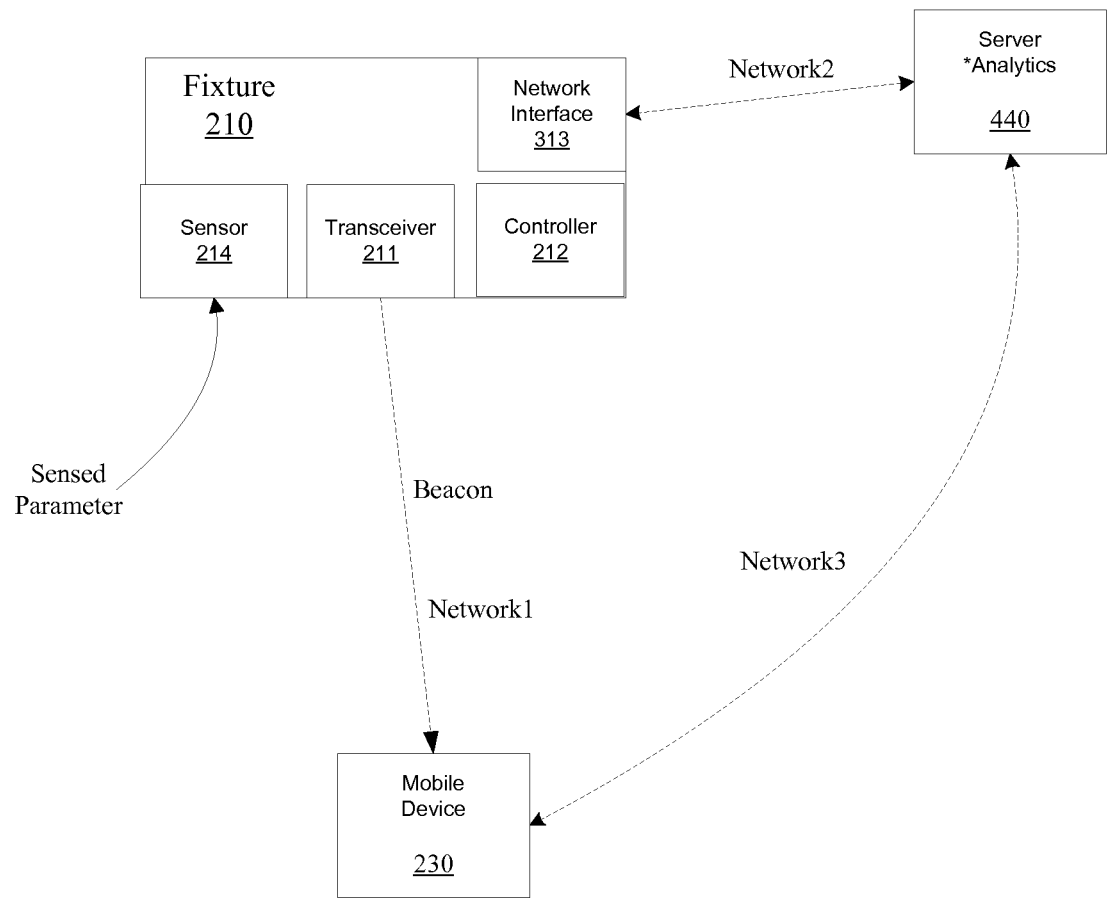
FIG. 4 shows a building fixture that transmits beacons and a mobile device that receives the beacons, according to another embodiment.

FIG. 4 shows a building fixture 210 that transmits beacons and a mobile device 230 that receives the beacons, according to another embodiment. For at least some embodiments, the controller 212 is further operative to manage communication with an upstream server (such as, server 440). For an embodiment, the building fixture 210 includes a network interface 413 that allows the building fixture 210 to communicate with an upstream network that is connected to the server 440.

Further, the mobile device 230 receives the beacons, and then communicates at least a portion of the information of the beacons to the upstream server 440. As shown, for an embodiment the mobile device 230 communicates with the upstream server 440 through a separate network (such as, a cellular network). However, for an embodiment, the mobile device 230 communicates with the upstream server 440 through the building fixture 210. As shown, a first network (network1) (for example, Bluetooth) can be established between the building fixture 210 and the mobile device 230, a second network (network2) can be established between the building fixture 210 and the upstream server 440, and a third network (network3) can be established between the mobile device 230 and the upstream server 440.

Figure 5:
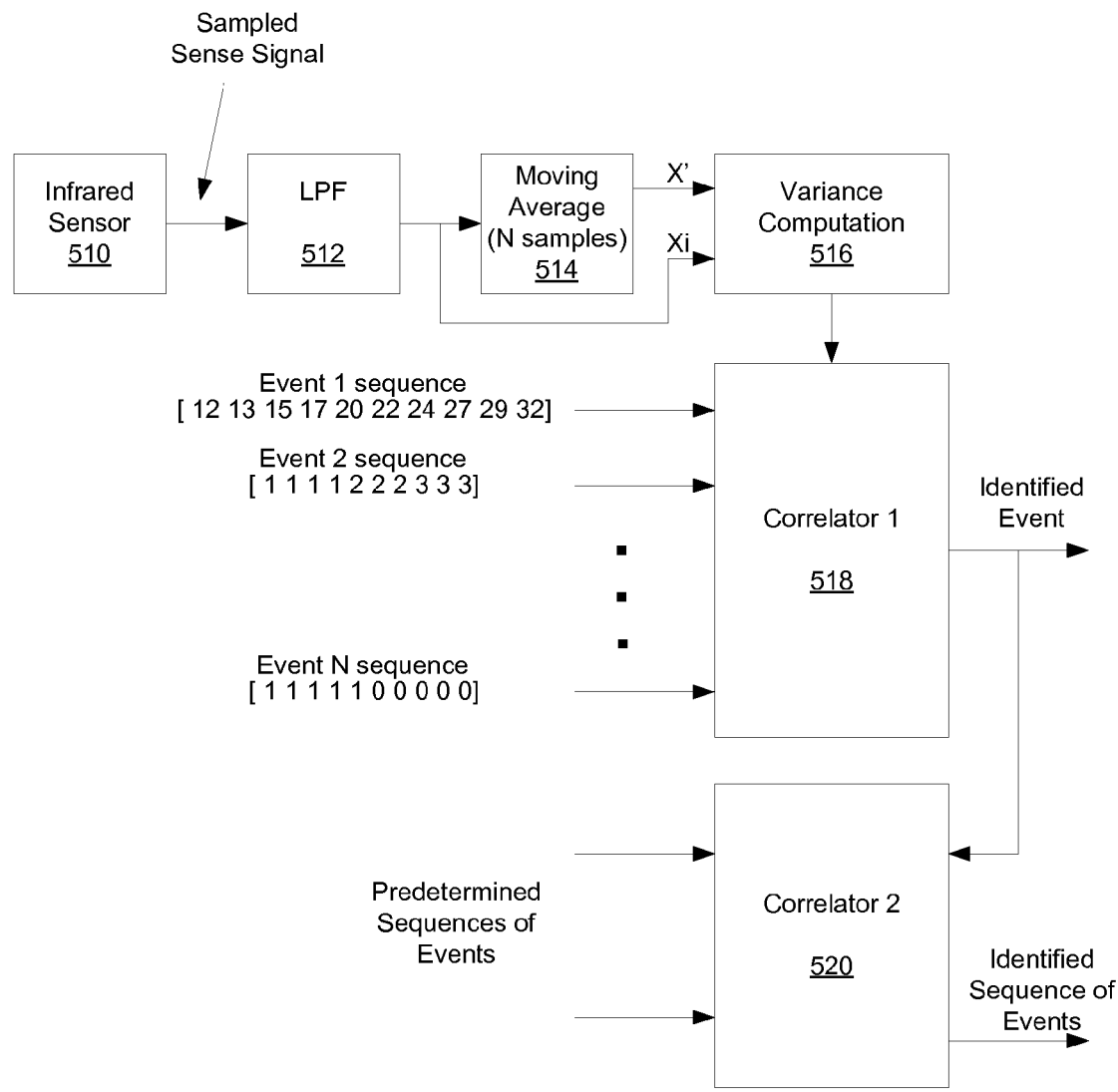
FIG. 5 shows a block diagram of motion matching circuitry, according to an embodiment.

FIG. 5 shows a block diagram of motion matching circuitry, according to another embodiment. As previously described, motion sensed by the building fixture can be matched with one or more predefined motions to identify the sensed motion, or associate the sensed motion with an activity or event that has occurred proximate to the building fixture. For at least some embodiments, these identified activities or events are included within the transmitted beacons, which allows the mobile device or a server connected to the mobile device to more accurately estimate the location of the mobile device.

For at least some embodiments, motion matching circuitry of the building fixtures matches the sensed motion with one of a plurality of stored patterns of events, and identifies an event associated with the sensed motion based on a match between a one of the plurality of patterns and the sensed motion.

FIG. 5 shows a block diagram of variance computation and sensed signal matching, according to an embodiment. The embodiments of variance computation and sensed signal matching can be utilized by the described intelligent controllers and fixtures, and aid occupancy and event detection. This embodiment includes an infrared (IR) sensor 510 that generates digital samples of a sensed IR signal. The sensed IR signal is filtered with an anti-aliasing low pass filter (LPF) 512. The filtered signal is averaged over N samples (514). The number of samples N is selectable and adaptive, but an embodiment can advantageously select N to be a power of two to reduce processing complexity. A variance computation block 516 receives the averaged signal (X') and the instantaneous samples (Xi) and generates a variance signal. A correlator 518 matches the variance signal with a one of stored event sequences to provide identification of an event based upon the sensed signal of the IR sensor 510.

Embodiments include the stored event sequences being of length less than or equal to the number of samples N. Event sequences need not be of equal lengths. Prefixing, annexing, or inserting an event sequence with zeros effectively shortens or divides its sequence.

For at least some embodiments, the correlation is computed by comparing each instantaneous sample to its corresponding value in each of the stored event sequences for all N samples. If an instantaneous sample meets or exceeds its corresponding value of a stored event, a logical TRUE bit is set for that sample of that event. An event is detected when all N samples are TRUE, and the selected event is that of the highest priority.

A second correlator 520 can be included for matching sequences of identified events, thereby providing more information about activities occurring in the structure (for example, a room of a building).

If, for example, a person (occupant) is walking through a room (structure), a unique sequence of events is output from correlator 518 due to the IR sensor 510. This sequence of events is input to correlator 520 at a non-uniform rate. If one such predetermined sequence of events is defined as an alternating pattern of small lobe and large lobe events, correlator 520 outputs the identified sequence of events.

Since there are numerous possible combinations and permutations of identified events output from correlator 518, the queue of length M of correlator 520 must be chosen to be of sufficient length to correlate with its predetermined sequences of events. A sample count may be utilized to time-tag identified events and thereby identify those events that should be discarded.

Figure 6:
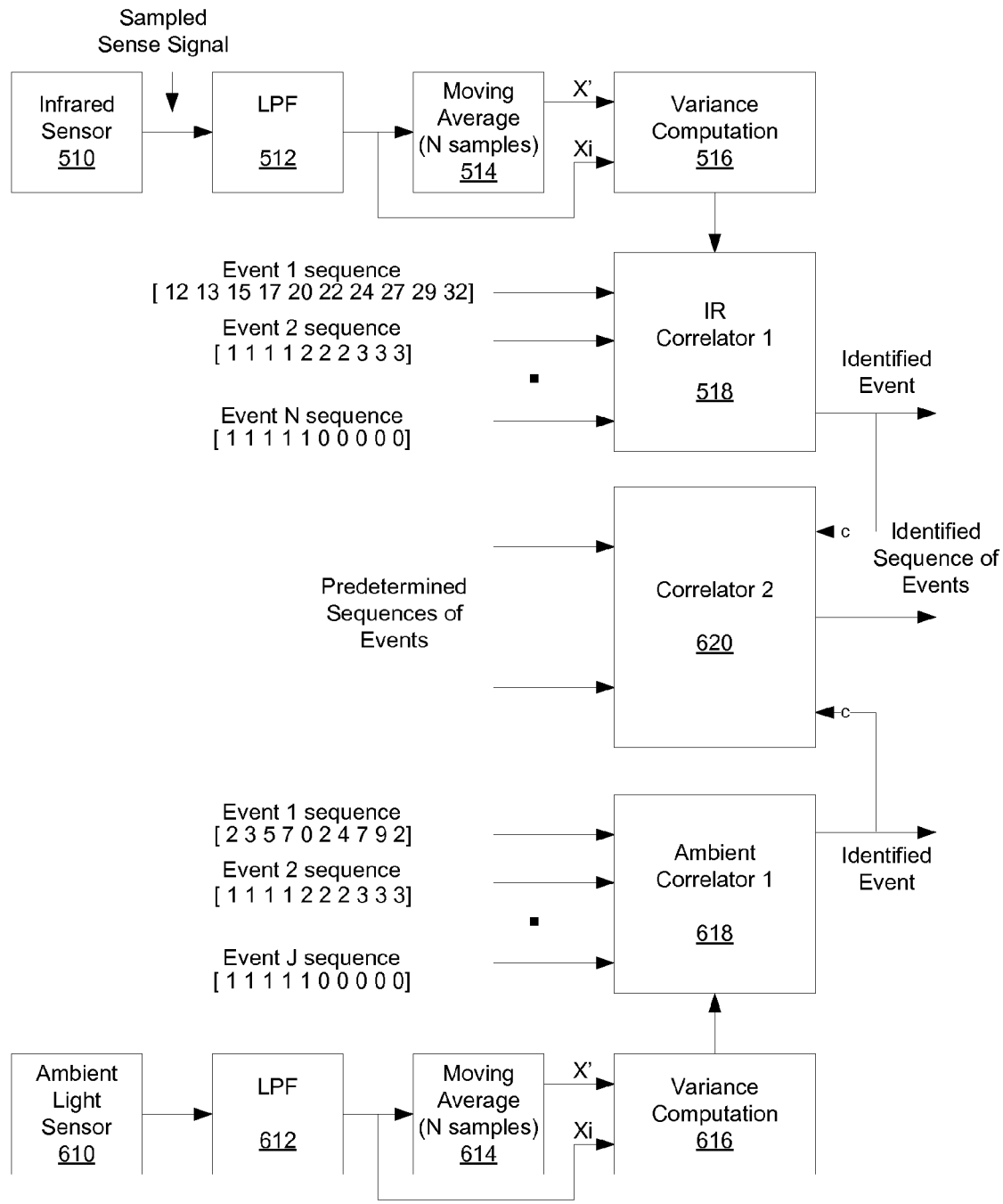
FIG. 6 shows a block diagram of motion matching circuitry, according to another embodiment.

FIG. 6 shows a block diagram of variance computation and sensed signal matching for multiple sensed signals, according to an embodiment. In addition to the Infrared sensor 510 and associated event identification circuitry of FIG. 5, the embodiment of FIG. 6 additionally includes the ambient light sensor 610 that generates digital samples of a sensed ambient light signal. The sensed ambient light signal is filtered with an anti-aliasing low pass filter (LPF) 612. The filtered signal is averaged over N samples (614). The number of samples N is selectable and adaptive, but an embodiment can advantageously select N to be a power of two to reduce processing complexity. A variance computation block 616 receives the averaged signal (X') and the instantaneous samples (Xi) and generates a variance signal. A correlator 618 matches the variance signal with a one of stored event sequences to provide identification of an event based upon the sensed signal of the ambient light sensor 610.

The second correlator 620 of FIG. 6 can receive identified events from both the IR correlator 518 and the ambient correlator 618 provides matching of sequences of identified events, thereby providing more information about activities occurring in the structure (for example, a room of a building).

The ambient light sensor 610 and associated event detection logic can be useful if, for example, motion within the structure where the sensors are located is small, and therefore, the variations of the sensed IR signal are small. The ambient light detector 610 and associated event detection circuitry can also help minimize false detections of events. For example, a standalone PIR sensor will falsely detect motion when placed in a structure in which there is significant hot air flow. The ambient light detector can be used to corroborate motion detection from the PIR sensor. Because the air flow does not trigger motion detection in the ambient light sensor, the PIR sensor's false motion triggers are ignored.

Figure 7:
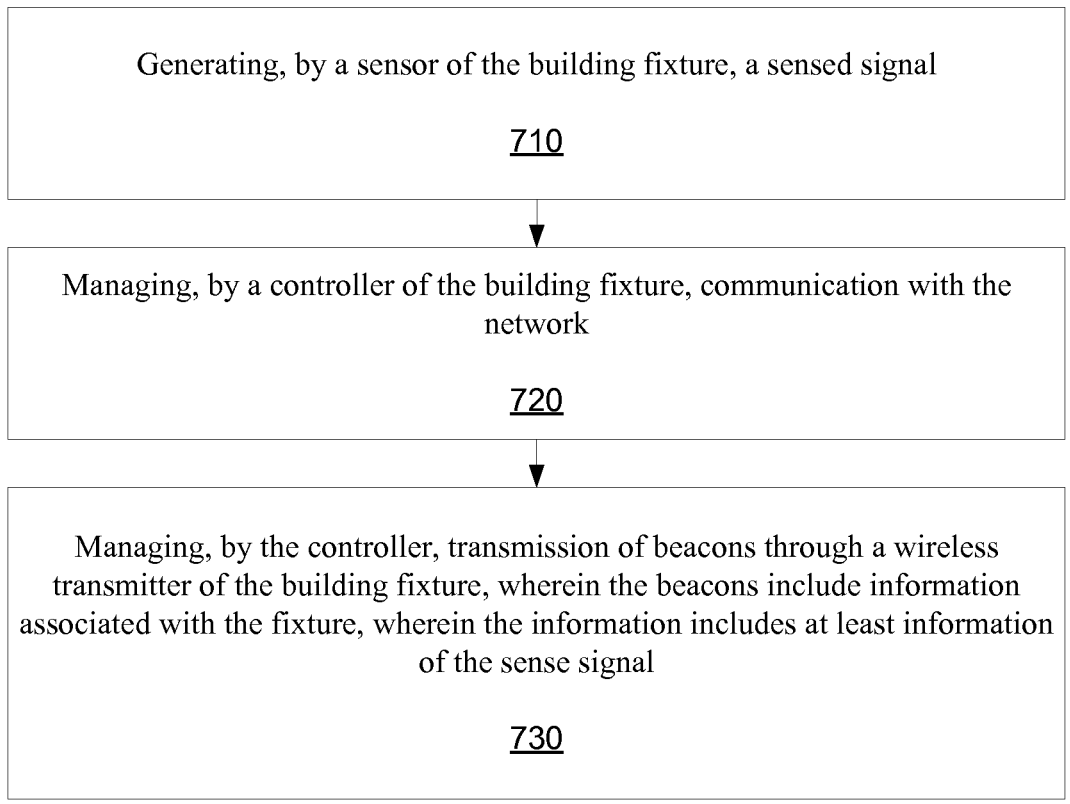
FIG. 7 is a flow chart that includes steps of a method of beacon transmission of a building fixture that includes sensed information, according to an embodiment.

FIG. 7 is a flow chart that includes steps of a method of beacon transmission of a building fixture that includes sensed information, according to an embodiment. A first step 710 includes generating, by a sensor of the building fixture, a sensed signal. A second step 720 includes managing, by a controller of the building fixture, communication with the network. A third step 730 includes managing, by the controller, transmission of beacons through a wireless transmitter of the building fixture, wherein the beacons include information associated with the fixture, wherein the information includes at least information of the sense signal.

Figure 8:
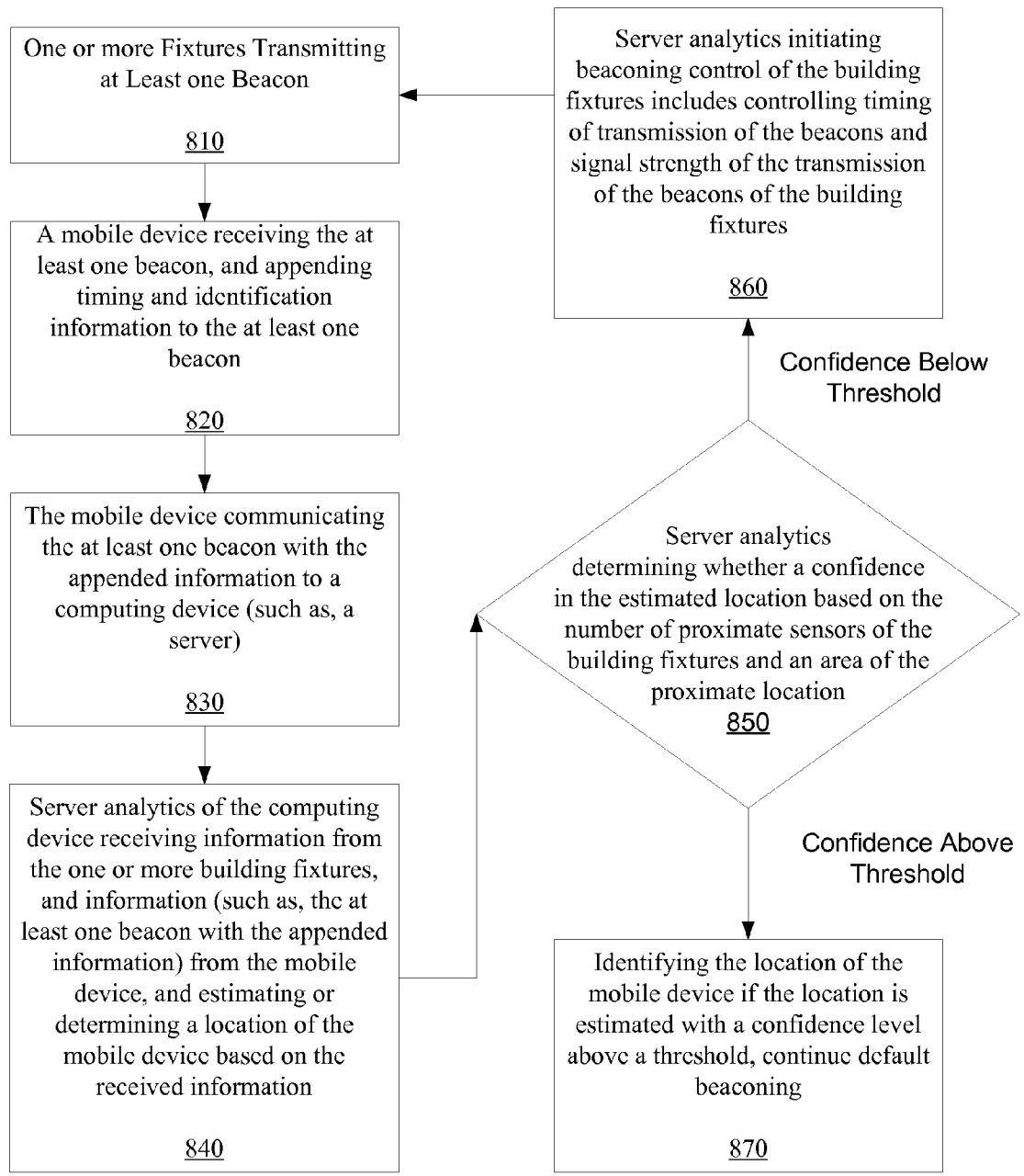
FIG. 8 is a flow chart that includes steps of a method of an external server controlling beacon transmission of a building fixture that includes sensed information, according to an embodiment.

FIG. 8 is a flow chart that includes steps of a method of a computing device controlling beacon transmission of a building fixture that includes sensed information, according to an embodiment. A first step 810 includes one or more building fixtures transmitting beacons, wherein at least one of the beacons includes at least sense information of the building fixture that transmitted the at least one beacon. A second step 820 includes a mobile device receiving the at least one beacon, and further appends timing and identification information to at least one beacon. For an embodiment, the timing information includes a time of reception of the at least one beacon. For an embodiment, the identification information includes identification information of the mobile device. A third step 830 includes the mobile device communicating the at least one beacon with the appended information to a computing device (such as, a server). For an embodiment, the mobile device communicates with the computing device through a second network. A fourth step 840 includes server analytics of the computing device receiving information from the one or more building fixtures, and information (such as, the at least one beacon with the appended information) from the mobile device, and estimating or determining a location of the mobile device based on the received information. A fifth step 850 includes the server analytics determining a confidence in the estimated location based on the number of proximate sensors of the building fixtures and an area of the proximate location. A sixth step 860 includes the server analytics initiating beaconing control of the building fixtures includes controlling timing of transmission of the beacons and signal strength of the transmission of the beacons of the building fixtures [this needs to be fine-tuned]. The beaconing control is executed if the confidence level in the estimated location of the mobile device is less than a threshold. A seventh step 870 includes identifying the location of the mobile device if the location is estimated with a confidence level above a threshold.

Figure 9:
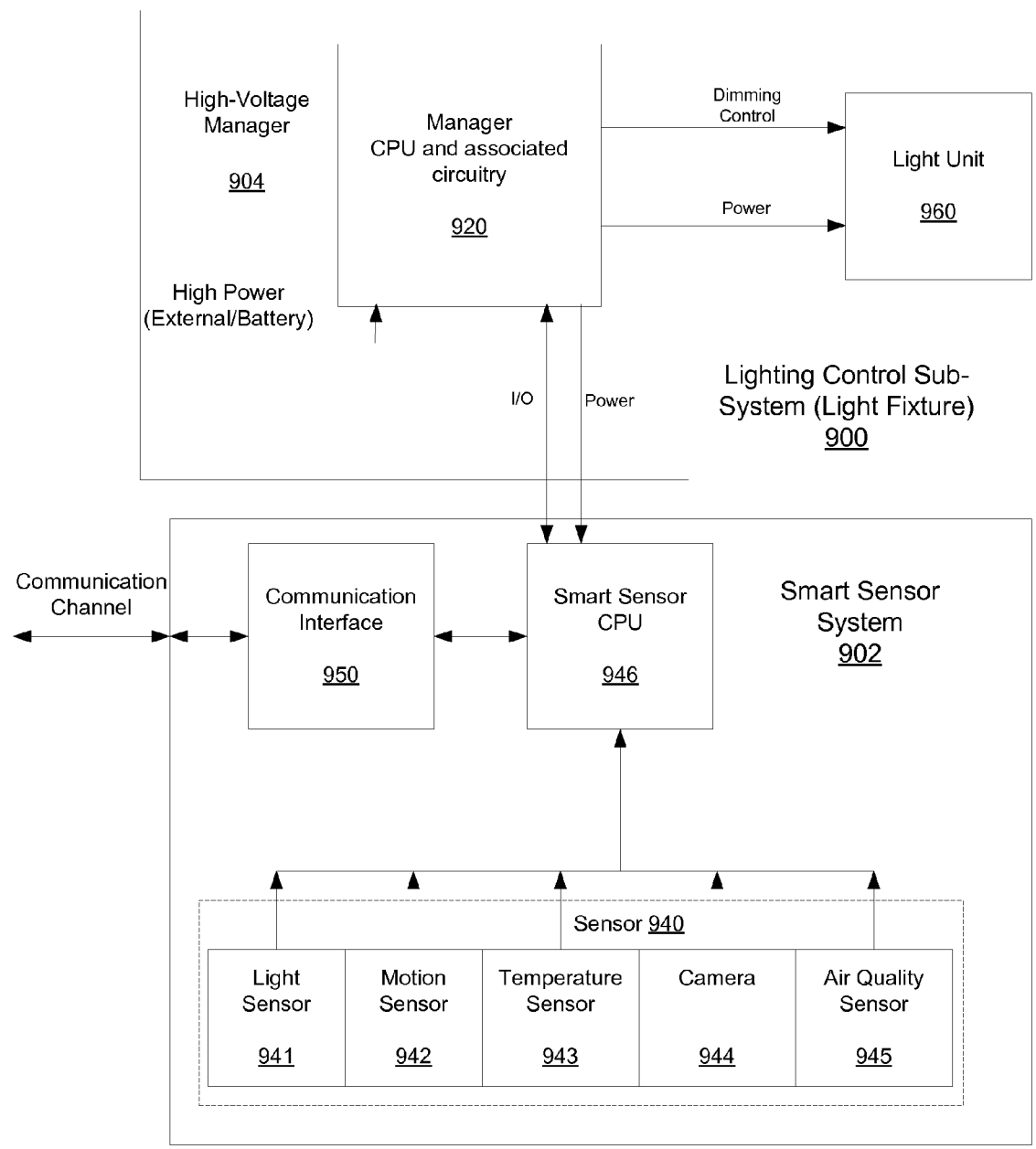
FIG. 9 shows a building fixture, according to another embodiment.

FIG. 9 shows a building fixture 900, according to another embodiment. This embodiment of the light fixture 900 includes a high-voltage manager 904 and a smart sensor system 902 that include a manager CPU 920 and smart sensor CPU 946 that operate in conjunction as a controller that independently manages and controls the operation of a lighting unit 960. The light fixture 900 can include any combination of sensors, such as, a light sensor 941, a motion sensor 942, a temperature sensor 943, a camera 944, and/or an air quality sensor 945. The light fixture 900 can receive profiles from elsewhere over a communications channel.

For the embodiment of FIG. 9, the high-voltage manager 904 receives a high voltage (for example, 120 Volts) and generates a power supply voltage for both the smart sensor system 902 (for example, 5 Volts) and the lighting unit 960, and a dimming control for the lighting unit 960. For this embodiment, both the high-voltage manager 904 and the smart sensor system 902 include CPUs (central processing units) 920 and 946 which operate in conjunction to control the lighting unit 960. While shown as separate controllers, it is to be understood that the operations and functionality of the two CPUs could be included within a single controller.

The previously describe direct communication link can be established using any one or more of the sensors of the lighting fixture 900. The light sensor 941 and the motion sensor 942 are likely candidates, but the possibilities are open. For example, some embodiments of camera sensors can be utilized as motion sensor, which can be used to establish the direct link. A user device establishes the direct communication link with the lighting fixture 900, for example, by pulsing a light which is received or sensed by the light sensor 941. Alternatively, or additionally, the user device establishes the direct communication link with the lighting fixture 900 through motion that is sensed by the motion sensor 942.

As shown, the light fixture 900 includes the light unit 960. It is to be understood that the light unit 960 could alternatively be external to the controller. For this embodiment, the controller (manager CPU 920 and smart sensor CPU 946) can include outputs to effect the light level changes. For example, the outputs can control relays to turn lights on and off, and control 0-10 V or PWM (pulse width modulation) outputs for dimming. The controller 920 can include a standard chipset that integrates a microprocessor unit, and interface for communicating different program instructions, and several ports for communicating with electronic devices.

The light fixture 900 additionally includes an interface 1050 that allows the lighting fixture to communicate with the central controller through the second communications link. The interface 950 can be a wired (for example Ethernet ®), or the interface can be wireless (for example, Zigbee ®). The interface 950 can provide a direct link to the central controller, or the interface can provide an intermediate link to an intermediate device (such as the previously described gateway).

While the lighting fixture 900 provides lighting control, it is to be understood the equivalent fixtures for controlling other environmental parameters, such as, light, temperature, and humidity can additionally or alternatively be implemented according to the described embodiments. Accordingly, the control information can include at least one of light intensity, lighting scenes, thermostat, and/or a security alarm.

For embodiments, the second communication link comprises at least one of a cellular link to a service provider wherein the central controller is connected to the service provider, or an 802.11 wireless link between the user device and the central controller.

Although specific embodiments have been described and illustrated, the described embodiments are not to be limited to the specific forms or arrangements of parts so described and illustrated. The embodiments are limited only by the appended claims.

The invention claimed is:

1. A fixture comprising:
a sensor, the sensor operative to generate a sense signal, wherein the sensor comprises a motion sensor operative to sense motion;
a wireless transmitter;
a controller, the controller operative to:
receive the sensed signal that includes the sensed motion;
match the sensed motion with one of a plurality of stored patterns of events; and
identify an event associated with the sensed motion based on a match between a one of the plurality of patterns and the sensed motion;
and
manage transmission of beacons through the wireless transmitter, wherein the beacons include information associated with the fixture, wherein the information includes the identified event.

2. The fixture of claim 1, further comprising communication circuitry, the communication circuitry operative to maintain a link with a network, and wherein the controller is further operative to manage communication with the network.

3. The fixture of claim 1, further comprising adaptively adjusting a transmission signal power of the transmitted beacons.

4. The fixture of claim 3, wherein the transmission signal power is adaptively adjusted to be at a first level upon sensing motion, and decaying to a lower level after a period of time.

5. The fixture of claim 1, wherein the sensor comprises a PIR (passive infrared) sensor.

6. The fixture of claim 1, wherein the sensor comprises an ambient light sensor.

7. The fixture of claim 6, wherein the ambient light sensor senses motion and presence of a person by sensing a variation in ambient light, and wherein the sensed motion and sensed presence of the person is included within the beacons.

8. The fixture of claim 6, wherein a signature of change of a sense signal of the ambient light sensor is used to detect and identify specific movement.

9. The fixture of claim 1, further comprising a sub-sensor, wherein the sub-sensor is interfaced with the sensor, and provides a sub-sensor sensed signal.

10. The fixture of claim 1, further comprising triggering the transmission of beacons based on sensing motion.

11. The fixture of claim 10, wherein the beacon transmission ceases after sensing no motion for at least a threshold amount of time.

12. The fixtures of claim 1, wherein the controller is further operative to manage communication with an upstream server, and wherein a mobile device that receives the beacons communicates at least a portion of the information of the beacons to the upstream server.

13. A building system, comprising:
a plurality of building fixtures, wherein one or more of the plurality of building fixtures comprises:
  a sensor, the sensor operative to generate a sense signal based on at least one of sensed motion or light;
  communication circuitry, the communication circuitry operative to maintain a link with a network;
  a wireless transmitter;
  a controller, the controller operative to:
    receive the sensed signal;
    manage communication with the network; and
    manage transmission of beacons through the wireless transmitter, wherein the beacons include information associated with the building fixture, wherein the information includes sensed motion or sensed light information;
wherein the building system further includes:
a system controller that is interfaced with the plurality of building fixtures, and wherein the system controller is operative to:
  received modified beacons from a mobile device;
  estimate a location of the mobile device; and
  aid a controller of at least one of the plurality of building fixtures in management of the transmission of beacons based on the estimated location of the mobile device.

14. The building system of claim 13, wherein the system controller aiding the controller of at least one of the plurality of building fixtures comprises the system controller managing a timing of the transmission of the beacons and a signal strength of the transmission of the beacons.

15. A method for beacon transmission of a building fixture that includes sensed information comprising:
  generating, by a sensor of the building fixture, a sensed signal, wherein the sensor comprises a motion sensor operative to sense motion;
  managing, by a controller of the building fixture, communication with a network;
  matching, by the controller of the building fixture, the sensed motion with one of a plurality of stored patterns of events;
  identifying, by the controller of the building fixture, an event associated with the sensed motion based on a match between a one of the plurality of patterns and the sensed motion; and
  managing, by the controller, transmission of beacons through a wireless transmitter of the building fixture, wherein the beacons include information associated with the building fixture, wherein the information includes the identified event.

16. The method claim 15, further comprising adaptively adjusting a transmission signal power of the transmitted beacons.

17. The method of claim 16, wherein transmission signal power is adjusted according to a predetermined sequence of power level and time intervals.

18. The method claim 15, wherein the transmission signal power is adaptively adjusted to be at a first level upon sensing motion, and decaying to a lower level after a period of time.

19. The method claim 15, wherein the sensor comprises an ambient light sensor.

20. The method claim 19, wherein the ambient light sensor senses motion and presence of a person by sensing a variation in ambient light, and wherein the sensed motion and sensed presence of the person is included within the beacons.

21. The method claim 15, further comprising triggering the transmission of beacons based on sensing motion.

* * * * *